Feb. 9, 1971  A. E. BREWSTER  3,561,863
COLOR DISPLAY APPARATUS

Filed July 8, 1968  3 Sheets-Sheet 1

*Inventor*
ARTHUR E. BREWSTER

By Charles L. Johnson
*Attorney*

Feb. 9, 1971    A. E. BREWSTER    3,561,863
COLOR DISPLAY APPARATUS

Filed July 8, 1968    3 Sheets-Sheet 2

Inventor
ARTHUR E. BREWSTER
By
Charles S. Johnson
Attorney

United States Patent Office
3,561,863
Patented Feb. 9, 1971

3,561,863
COLOR DISPLAY APPARATUS
Arthur Edward Brewster, Cheshunt, Hertfordshire, England, assignor to International Standard Electric Corporation, New York, N.Y., a corporation of Delaware
Filed July 8, 1968, Ser. No. 743,189
Claims priority, application Great Britain, Sept. 21, 1967, 42,934/67
Int. Cl. G03g 15/00
U.S. Cl. 355—3                                    16 Claims

ABSTRACT OF THE DISCLOSURE

Apparatus for displaying in color information contained in signals received by the apparatus. A latent image corresponding to the received signals is formed either electromagnetically or electrostatically on a display recording surface by selectively charging those areas of the recording surface which surround the desired image. The display recording surface is permanently colored with an array of at least two color regions, preferably a reseau of color lines arranged parallel to an axis of the recording surface and in groups, with each of the lines of a group being a different primary color and the order of arrangement of the lines being the same in each group to provide a repetitive order of colors. Powder particles having a color which contrasts with the colored lines are applied to the latent image to form a two-dimensional color image which is viewable directly from the display recording surface without the need of projection or printing means.

BACKGROUND OF THE INVENTION

In general this invention relates to apparatus for displaying color information contained in a signal, and more particularly to a color image formed on a display record surface which is covered with a reseau of colored lines.

Existing color arrangements for displaying color information include photographic deposition of metallic silver without using electromagnetic or electrostatic means for selecting the areas to be obscured as described herein. The inventive arrangement has particular utility with the electromagnetic printing and display apparatus known as the "Ferrodot" apparatus.

SUMMARY OF THE INVENTION

It is therefore an object of the invention to provide apparatus for displaying in color information contained in a signal applied thereto.

The term color used hereinafter is defined to include black and white.

According to the broader aspects of the invention, apparatus is provided for displaying in color information contained in a signal applied thereto wherein a colored image is formed on a display record surface of said apparatus by depositing thereon a medium which adheres to those areas of said display record surface which surround said colored image and which is of a color which contrasts the image color, said display record surface being covered with an array of at least two colored regions.

BRIEF DESCRIPTION OF THE DRAWINGS

The foregoing object and other features according to the invention will be better understood from the following description with reference to the accompanying drawings, in which.

BRIEF DESCRIPTION OF PREFERRED EMBODIMENTS

Figure 1:
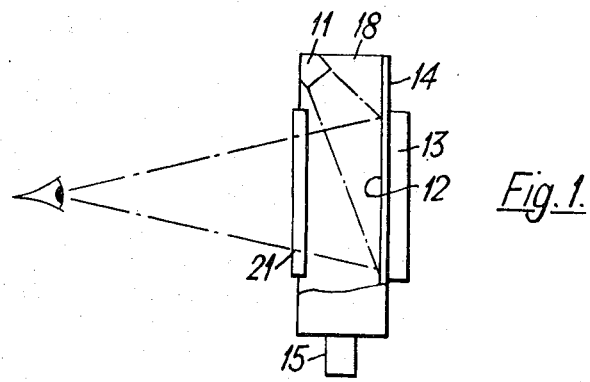
FIG. 1 diagrammatically illustrates in part sectioned side elevation, apparatus according to the invention for displaying in color, information contained in a signal applied thereto.

Information, for example facsimile, alpha-numeric or other characters, contained in a signal may be displayed in color utilizing the apparatus according to the invention which is shown diagrammatically in part sectioned side elevation in the drawing according to FIG. 1.

Referring to FIG. 1, the apparatus shown therein comprises a shallow sealed chamber having a main body 18, a transparent frontplate 21, for example of glass, a backplate 14 having a display record surface 12 of either a magnetic or a dielectric material which is coated with an array of at least two colored regions, a recording head assembly 13, a white light source 11, and agitating means 15, for example, an air blower unit.

In operation, the output signal of say a computer is applied to the recording head assembly 13 which causes a charge pattern to be formed on the display record surface 12 in the form of those areas of the display record surface 12 which surround the colored image which is to be formed thereon. The sealed chamber contains powder particles which are attractive to the charge pattern and which are of a color which contrasts the image color or colors. When the charge pattern is formed the agitating means 15 are rendered operative thereby causing the powder particles to be dispersed in the space enclosed by the main body 18 between the frontplate 21 and the backplate 14. The powder particles adhere to the charge pattern on the display record surface 12 to form a two-dimensional colored image which is illuminated by the white light source 11 and which is viewable through the transparent frontplate 21 by reflected light.

If very fine powder is used and it gives rise to a transparent cloud when agitated then the powder may be continuously agitated by the agitating means 15 or suspended in a transparent fluid in which case the agitating means 15 would not be required. If other than fine powder is used then the agitating means would be intermittently operated to cause the powder to be dispersed in the space enclosed by the main body 18 between the frontplate 21 and the backplate 14 when it is required to obtain a two-dimensional visible colored image.

Alternatively, the main body 18 and the transparent frontplate 21 of the apparatus shown in FIG. 1 could be replaced by a transparent diaphragm unit which with the backplate 14 would form a sealed chamber. In this arrangement the powder particles which would be contained within the sealed chamber could be caused to be dispersed in the space enclosed by the transparent diaphragm unit by causing the transparent diaphragm unit to be continually compressed towards and expanded away from the backplate 14.

The charge patterns may be formed either electromagnetically in which case the display record surface 12 would be of a magnetic material, for example, iron oxide or nickel/cobalt and the powder particles would be magnetic, for example magnesium-nickel ferrite or nickel-zinc ferrite powder particles or electrostatically in which case the display record surface 12 would be of a dielectric material and the powder particles would be dielectric, insulating or ferroelectric powder particles, for example barium titanate. In either case it would be necessary to add a coloring pigment to the powder particles in order to provide powder which is of the correct color to contrast with the color or colors of the image.

When the display record surface 12 is of a magnetic material the backplate 14 would be of an insulating nonmagnetic material, for example a plastics material. In order to ensure that the recording means 13 when situated on the opposite side of the backplate 14 to the display record surface 12, as is the case of the apparatus shown in FIG. 1, will perform their function, it is necessary to arrange that the insulating non-magnetic material used for the backplate 14 is not more than approximately 0.001 inch thick.

Figure 2:
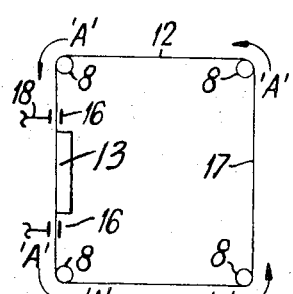
FIG. 2 diagrammatically illustrates in side elevation a modified arrangement of the apparatus shown in the drawing according to FIG 1.

Alternatively the backplate 14 may be replaced by a band or closed loop 17 having a display record surface 12 of either a magnetic or a dielectric material which is coated with an array of at least two colored regions, the band 17 being guided as shown in the drawing according to FIG. 2 by rollers 8 and driven by means not shown in the drawing in the direction of the arrows A.

Referring to FIG. 2 which diagrammatically illustrates in side elevation a modified arrangement of the apparatus shown in the drawing according to FIG. 1, the band 17 during rotation passes through sealing units 16 which form part of the main body 18. The sealing units 16 are arranged to allow the band 17 to be moved relative to the main body 18 and the recording head assembly 13 and at the same time prevent the loss of the powder particles from within the sealed chamber.

Figure 3:
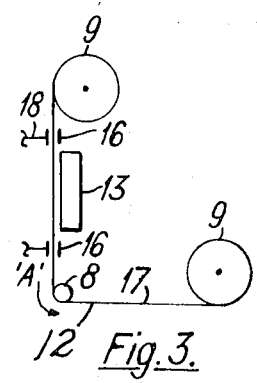
FIG. 3 diagrammatically illustrates in side elevation part of the apparatus shown in the drawing according to FIG. 2 which has been modified to include a different arrangement for the recording medium.

Although the band 17 is shown in the form of a continuous loop, it may be in the form of a long, open-ended roll, carried on take-up reels. As an example of this feature, FIG. 3 illustrates diagrammatically in side elevation part of the apparatus shown in the drawing according to FIG. 2 which has been modified to show the band 17 in the form of a long, open-ended roll which is carried on take-up reels 9. This feature therefore enables the band 17 with the colored images thereon to be retained and be available for any future display.

Figure 4:
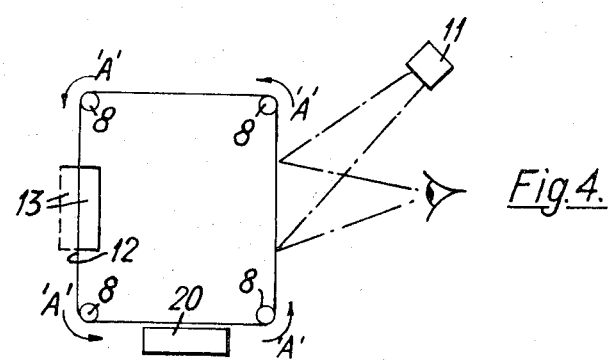
FIG. 4 diagrammatically illustrates in side elevation a modified arrangement of the apparatus shown in the drawing according to FIG. 2.

As shown in the drawing according to FIG. 4 which diagrammatically illustrates in side elevation a modified arrangement of the apparatus shown in the drawing according to FIG. 2, the viewing position and the recording position need not be at the same location during the rotation of the band 17.

When the viewing and recording position are at different locations, as is the case with the apparatus shown in FIG. 4, then the application of the powder particles to the charge pattern need not be at the record position, for example the powder application may be performed by a dispenser 20 which contains the powder particles and which is situated between the recording and viewing positions. The dispenser 20 may take many forms, for example it may be provided by any one of the fluid powder bed arrangements as disclosed in British Patent specification No. 1,120,900.

When utilizing a dispenser 20 situated remotely from the recording position, the recording head assembly 13 may be situated, as shown in dotted detail in FIG. 4, adjacent to the display record surface 12 although it is preferable to position the recording head assembly 13 on the opposite side of the band 17 to the display record surface 12 since it is less likely to be contaminated with the powder particles in this position.

It should be noted that the powder application could be performed in the same manner as described with reference to the drawings according to FIGS. 1 to 3 when the viewing and recording positions are at different locations i.e. at the recording position, but it would not in this case be necessary to provide the transparent frontplate 21 and in the case of the diaphragm unit this need not be of a transparent material for this application.

Figure 5:
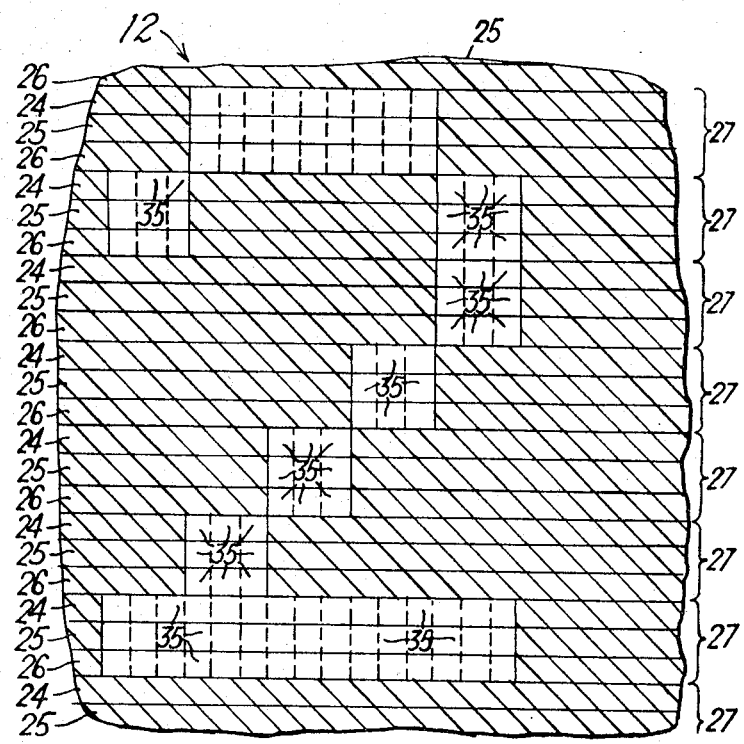
FIG. 5 diagrammatically illustrates an enlarged plan view of part of the display record surface of the apparatus according to the invention.

As previously stated, the display record surface 12 of the apparatus according to the invention is coated with an array of at least two colored regions and this may be effected in a variety of ways, for example as shown in the drawing according to FIG. 5 which diagrammatically illustrates an enlarged plan view of part of the display record surface of the apparatus according to the invention.

Referring to FIG. 5, the display record surface 12 is covered with an array of colored lines 24, 25 and 26 which extend in parallel relationship along one axis thereof. The lines 24 are of one primary color, for example red, the lines 25 are of another primary color, for example blue, and the lines 26 are of another primary color, for example yellow.

As shown in FIG. 5, the colored lines are split into groups 27 such that each group contains the same number of differently colored (primary) lines i.e. three arranged in the same order. It should be noted that while three primary colors are used in each group, the scope of the invention is not to be considered as being limited to this number, any number of different primary colors could be used in each group with a minimum of two, the number used depends on the color range required for the displayed images.

The complete display record surface 12 which is covered with these colored lines is arranged in association with the recording head assembly 13 such that it effectively though not physically comprises a plurality of chargeable areas 35, the length and width of each of the chargeable areas being equivalent to the width of any one of the colored lines, thus each of the chargeable areas 35 is one of the primary colors.

In the drawing according to FIG. 5, a figure two has been formed on the display record surface 12 which when viewed by the reflected light would appear as a white figure two provided the examples of the primary colors for the lines 24, 25 and 26 and mentioned in a previous paragraph are utilized since the combination of these three colors would produce white.

This is achieved by causing the recording head assembly 13 to charge all of the chargeable areas 35 in this part of the display record surface 12 except those which form the figure two. The powder particles which in this case would be black in color would be attracted to the charged pattern thereby leaving the figure two exposed.

If, for example it is required to provide a green figure two then the red chargeable areas 35 which form part of the figure two in FIG. 5 would also need to be charged by the recording head assembly 13 thereby attracting the black powder particles thereto. Likewise an orange figure two could be provided by causing the blue chargeable areas 35 which form part of the figure two in FIG. 5 to be covered with the black powder particles, thereby leaving only the red and yellow chargeable areas exposed.

Thus by selection of the type and number of primary colored lines in each of the groups 27 various colored images may be formed on the display record surface 12.

Shades of the various colors may also be obtained by arranging that the number of chargeable areas 35 of one primary color which help to form an image is less than the number of the remaining chargeable areas 35 within that image which are of another or other primary colors. For example, a figure two which is of a bluish green color may be obtained from the figure two shown in FIG. 5 by causing all of the red chargeable areas 35 and some of the yellow chargeable areas 35 which form part of the figure two, to be covered with the black powder particles.

The recording head assembly 13 which forms the charge patterns electromagnetically may be provided by any one of the magnetic recording head assemblies disclosed in co-pending U.S. patent application Ser. No. 754,579, filed Aug. 22, 1968.

Figure 6A:
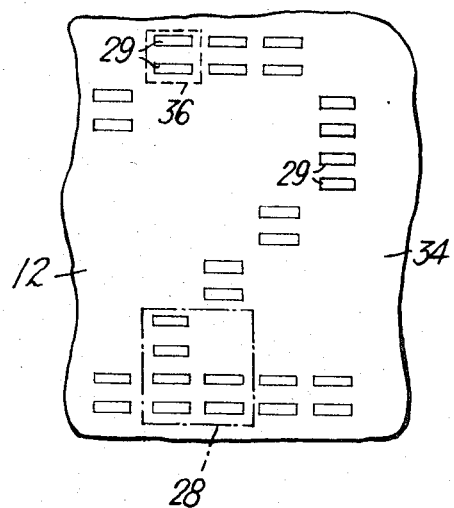
FIG. 6A diagrammatically illustrates an enlarged plan view of part of the display record surface of the apparatus according to the invention.

Alternatively, the coating of the display record surface with an array of at least two color regions may be effected as shown in the drawing according to FIG. 6A, providing magnetic printing apparatus similar to the apparatus outlined in the British patent specification No. 1,052,543 is utilized. This magnetic printing apparatus includes a recording head which comprises a block of ferrite material having a pattern of intersecting slots cut into the operative face, holes drilled through the block from the opposite face to intercept the bases of the slots at various points and energizing windings passed through the holes and along the bases of each section of the slots to create a plurality of magnetic recording gaps on the operative face. The pattern of slots, either full length or part length, can define the outline of any required character. In the apparatus according to the invention this recording head would be arranged such that the pattern of slots in the operative face of the ferrite block would be as shown in the drawing according to FIG. 6B wherein it can be seen that the intersecting slots 4 divide the operative face of the ferrite block into a large number of parts i.e. the raised sections or posts 30 to 33.

Referring to FIG. 6A which diagrammatically illustrates an enlarged plan view of part of the display record surface of the apparatus according to the invention, a black figure two is shown on a white background 34, the figure two being formed by the black colored regions 29.

In practice, before the image is formed, the entire surface 12 is covered with a regular array of the black colored regions 29 on the white background 34 and each magnetizable "bit" of the display record surface 12, i.e. the area enclosed by the dotted line 36 contains two of these black colored regions.

Figure 6B:
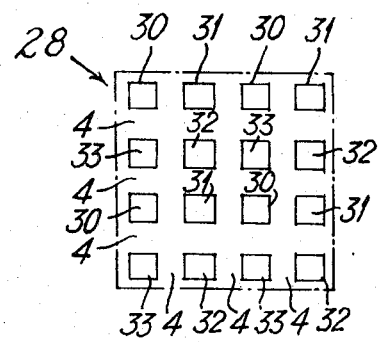
FIG. 6B diagrammatically illustrates a plan view of a further enlargement of part of that part of the display record surface shown in the drawing according to FIG. 6A.

Referring to FIG. 6B which diagrammatically illustrates a further enlargement of part of that part of the apparatus according to the invention which is shown in the drawing according to FIG. 6A, i.e. the area enclosed by the chain dotted line 28, the display record surface 12 and its supporting member, i.e. the band 17 or backplate 14 have been removed to expose the operative face of the ferrite block which forms part of the recording head assembly and which covers the entire display record surface of the backplate 14 or the band 17 at each record position.

Each magnetizable "bit" of the display record surface is energized by those parts of the slots 4 with the energizing windings therein situated between the four posts 30 to 31 such that either the regions situated directly above the posts 30 and 31 and the posts 32 and 33 are magnetized or the regions situated directly above the posts 30 and 33 and the posts 31 and 32 are magnetized, the black colored regions 29 are situated directly above those parts of the slots 4 between the posts 30 and 31 and between the posts 32 and 33.

In the absence of an input signal the overall effect of the black and white regions is that the display record surface is presented at the viewing position as a greyish color but by selectively energizing each of the magnetizable "bits" in accordance with the input signal such that either the black or the white areas thereof are energized then when a white magnetically attractive powder is applied to the charge pattern each magnetizable "bit" will be presented as either a white or a black spot depending on whether the powder covers the white background 34 between the posts 30 and 33 and the posts 31 and 32 or the black colored regions 29 between the posts 30 and 31 and the posts 32 and 33.

That part of the operative face of the ferrite block shown in the drawing according to FIG. 6B would therefore, in order to produce that part of the black figure two on the display record surface which is enclosed by the chain dotted line 28, be arranged such that a magnetic field is produced between the posts 30 and 31 and the posts 32 and 33 of the top right hand magnetizable "bit" thereby magnetizing the black colored regions 29 situated thereabove on the display record surface to which the white magnetic powder would be attracted thereby presenting this magnetizable bit as a white spot while for each of the other three magnetizable "bits" enclosed by the chain dotted line 28 a magnetic field would be produced between the posts 30 and 33 and the posts 31 and 32 thereby magnetizing the white background 34 therebetween to which the white magnetic powder would be attracted thereby leaving the black colored regions exposed and presenting these three magnetizable bits as black spots. Thus by selectively repeating this process over the entire display record surface a desired facsimile, alpha-numeric or other characters e.g. the figure two can be produced in black on the white background 34. It should be noted that it would be more usual to produce white characters on a black background in which case the regions 29 would be white in color and the magnetic powder would be black in color. However, it should also be noted that other contrasting colors could be used in place of black and white.

The band 17 and the rollers 8 shown in FIG. 2 may be replaced by the printing drum of a non-percussive printing machine. It would be necessary in this instance to arrange that the drum diameter be made such that the image area to be displayed can be covered without undue curvature. The display record surface of the printing drum would be of either a magnetic or dielectric material coated with an array of at least two colored regions.

An important feature of the display apparatus outlined in the preceding paragraphs with reference to FIGS. 2 to 6 is that it could form part of a system which also provides a permanent record of the colored images. A permanent record of the colored image may be obtained by transferring the powder pattern from the display record surface of the band 17 or the printing drum by conventional non-percussive printing machine techniques onto the surface of a substrate i.e. a paper strip which would have thereon the same array of at least two colored region as the display record surface.

Alternatively, any one of the display apparatus outlined in the preceding paragraphs could form part of a system if the same signals are fed simultaneously to the printing drum of a conventional non-percussive printing machine which forms part of the system, operating in a manner outlined in preceding paragraphs and running without paper (specially colored) feed. The stored pattern on the printing drum would thus be ameded constantly to correspond with the colored display. A permanent record of any selected display could be obtained at will merely by initiating the paper feed for the printing machines at the proper moment to achieve correct color phasing.

It should also be noted that if the ambient lighting which surrounds the colored image is of sufficient intensity and quality then the white light source 11 can be dispensed with.

It is to be understood that the foregoing description of specific examples of this invention is made by way of example only and is not to be considered as a limitation on its scope.

I claim:

1. Apparatus for displaying in color, information contained in signals applied thereto comprising:
   (a) a display record surface covered with an array of at least two color regions;

(b) recording means for creating on said display record surface a latent image by selectively charging discrete portions thereof in accordance with said received signals; and (c) colored image forming means including a charge-attractable particle medium having a color contrasting with the color image, and means to apply the charge-attractable particles to the latent image.

2. Apparatus as claimed in claim 1 wherein said recording means form the latent image by selectively charging the portions of said display record surface which surround the desired color image.

3. Apparatus as claimed in claim 2 wherein the arrangement of colored regions covering said display record surface comprises an array of colored lines extending in parallel relationship along one axis of said surface, the colored lines being arranged in groups of at least two with each one of the lines in each group being of a color which differs from the color of the other lines in the group, and wherein each group is formed by the same number of colored lines arranged in the same order according to color.

4. Apparatus as claimed in claim 3 wherein the recording means, in forming the latent image on said display record surface, selectively charge discrete regions the length and width of each of which is equivalent to the width of any one of the colored lines, and wherein the lines are of primary colors.

5. Apparatus as claimed in claim 4 wherein depending on the intensity required for the colored image, the discrete regions which form same are arranged in either equal or unequal ratios according to their primary color.

6. Apparatus as claimed in claim 2 wherein the latent image is formed electromagnetically on said display record surface and the recording means include a recording head which comprises a block of ferrite material having a pattern of intersecting slots cut into the operative face, holes drilled through the block from the opposite face to intercept the bases of the slots at various points and energizing windings passed through the holes and along the bases of each section of the slots to create a plurality of magnetic recording gaps on the operative face, the pattern of slots being in the form of a two-dimensional co-ordinate array, the operative face of the block being divided into a plurality of discrete areas which are arranged in rows and columns in a regular array of groups of four, the section of a slot between adjacent discrete areas in each group being provided with a separate energizing winding, and wherein each of the groups is associated with a discrete section of said display record surface.

7. Apparatus as claimed in claim 6 wherein said display record surface is coated with a regular array of discrete regions of one color on a background of another color which contrasts the color of the discrete regions, and wherein each discrete section of said display record surface which is associated with a group of said discrete areas of said recording head contains two of the discrete colored regions which are each associated with an adjacent pair of the discrete areas in either a row or column of each group.

8. Apparatus as claimed in claim 7 wherein said recording means are arranged to selectively magnetize each of the discrete sections of said display record surface such that either the discrete colored regions which are each associated with an adjacent pair of the discrete areas in a row of each group or those areas of the colored background associated with an adjacent pair of the discrete areas in a column of each group are magnetized and wherein said charge-attractable particles are of the same color as magnetized colored background are attracted to each of the said discrete sections of said display record surface thereby either exposing or covering said discrete colored regions to provide a two-dimensional image of said one color on a background of said another color.

9. Apparatus as claimed in claim 8 wherein said one color is white and wherein said another color is black.

10. Apparatus as claimed in claim 2 wherein said charge-attractable particles are contained in a cavity the rear wall of which is formed by said display record surface, wherein said display record surface is provided by a coating of chargeable material formed on a substrate, the chargeable material being on the inside surface of said rear wall while said recording means are situated in close proximity to the outside surface of said rear wall, and wherein said cavity is provided with means for causing said particles to be dispersed therein.

11. Apparatus as claimed in claim 10 wherein said means for causing said particles to be dispersed within said cavity comprise a diaphragm which together with said display record surface forms said cavity.

12. Apparatus as claimed in claim 10 wherein said means for causing said particles to be dispersed within said cavity comprises an air blower.

13. Apparatus as claimed in claim 10 wherein said means for causing said particles to be dispersed within said cavity are provided by suspending said particles in a transparent fluid within said cavity.

14. Apparatus as claimed in claim 10 wherein when said display record surface is fixed relative to said recording means said substrate is formed by a first member which is an integral part of said cavity.

15. Apparatus as claimed in claim 10 wherein when said display record surface is movable relative to said recording means said substrate is formed by a tape which is movable through sealing means which form part of said cavity, the chargeable coating on the surface of said tape forming the rear wall of said cavity.

16. Apparatus as claimed in claim 10 wherein when the recording and viewing positions are at the same location said cavity is provided with a transparent front wall to facilitate the viewing of said colored image.

References Cited
UNITED STATES PATENTS

| | | | |
|---|---|---|---|
| 3,117,488 | 1/1964 | Giordano | 355—5X |
| 3,313,623 | 4/1967 | Bixby | 355—4X |

JOHN M. HORAN, Primary Examiner

R. A. WINTERCORN, Assistant Examiner

U.S. Cl. X.R.

355—4